United States Patent [19]

Tumey et al.

[11] Patent Number: 4,836,832
[45] Date of Patent: Jun. 6, 1989

[54] METHOD OF PREPARING COATED ABRASIVE HAVING RADIATION CURABLE BINDER

[75] Inventors: Michael L. Tumey, St. Paul; Donna W. Bange, Eagan; Aida F. Robbins, Maplewood, all of Minn.

[73] Assignee: Minnesota Mining and Manufacturing Company, St. Paul, Minn.

[21] Appl. No.: 178,067

[22] Filed: Apr. 5, 1988

Related U.S. Application Data

[62] Division of Ser. No. 895,315, Aug. 11, 1986, Pat. No. 4,751,138.

[51] Int. Cl.$^4$ .............................................. B24D 3/00
[52] U.S. Cl. ........................................ 51/293; 51/295; 427/44
[58] Field of Search ................... 51/293, 295; 427/44

[56] References Cited

U.S. PATENT DOCUMENTS

| | | | |
|---|---|---|---|
| 4,047,903 | 9/1977 | Hesse et al. | 51/295 |
| 4,130,690 | 12/1978 | Lien et al. | 428/412 |
| 4,156,035 | 5/1979 | Tsao et al. | 427/44 |
| 4,250,053 | 2/1981 | Smith | 252/426 |
| 4,428,807 | 1/1984 | Lee et al. | 204/159 |
| 4,457,766 | 7/1984 | Caul | 51/298 |
| 4,588,419 | 5/1986 | Caul et al. | 51/298 |
| 4,617,194 | 10/1986 | Scott et al. | 427/44 |
| 4,642,126 | 2/1987 | Zadar et al. | 51/295 |
| 4,644,703 | 2/1987 | Kaezmarek et al. | 51/298 |

FOREIGN PATENT DOCUMENTS 1956810 7/1971 Fed. Rep. of Germany .

Primary Examiner—A. Lionel Clingman
Assistant Examiner—Willie J. Thompson
Attorney, Agent, or Firm—Donald M. Sell; Walter N. Kirn; David L. Weinstein

[57] ABSTRACT

Coated abrasive product and a process for producing same. The coated abrasive product comprises a backing, a make coat, and a size coat, and may contain an optional saturant coat, an optional presize coat, an optional backsize coat, or any combination of said optional coats, in which at least one coat is formed from a composition curable by electromagnetic radiation comprising:

(A) a curable portion containing both ethylenically unsaturated groups and 1,2-epoxide groups, which groups can be in the same compound or in different compounds, and (B) a photoinitiator portion.

The photoinitiator portion activates both free-radical and cationic curing mechanisms.

2 Claims, 1 Drawing Sheet

METHOD OF PREPARING COATED ABRASIVE HAVING RADIATION CURABLE BINDER

This is a division of application Ser. No. 895,315 filed Aug. 11, 1986, now U.S. Pat. No. 4,751,138.

BACKGROUND OF THE INVENTION

This invention relates to coated abrasive products, and, in particular, to coated abrasive products having a radiation curable binder.

Coated abrasives generally comprise a backing and abrasive granules supported thereby and adhered thereto. The backing may be paper, cloth, polymeric, film, vulcanized fiber, etc. or a combination of two or more of these materials. The abrasive granules may be formed of flint, garnet, aluminum oxide, alumina-zirconia, diamond, silicon carbide, etc. Binders for the purpose of adhering the granules to the backing include phenolic resins, hide glue, varnish, epoxy resins, urea-formaldehyde resins, and polyurethane resins.

The coated abrasive may employ a "make" coat of resinous binder material which is utilized to secure the ends of the abrasive granules onto the backing as the granules are oriented and a "size" coat of resinous binder material over the make coat which provides for firm adherent bonding of the abrasive granules. The size coat resin may be of the same material as the make coat resin or it may be of a different resinous material.

In the manufacture of conventional coated abrasives, the make coat resinous binder is first applied to the backing, the abrasive granules are then applied, the make coat is partially cured, the size coat resinous binder is then applied, and finally, the construction is fully cured. Generally, thermally curable binders provide coated abrasives having excellent properties, e.g. heat resistance. Thermally curable binders include phenolic resins, epoxy resins, and alkyd resins. With backings formed of polyester or cellulose, however, curing temperatures are limited to a maximum of about 130° C. At this temperature, cure times are sufficiently long to necessitate the use of festoon curing areas. Festoon curing areas are disadvantageous in that they result in formation of defects at the suspension rods, inconsistent cure due to temperature variations in the large festoon ovens, sagging of the binder, and shifting of abrasive granules. Furthermore, festoon curing areas require large amounts of space and large amounts of energy. Accordingly, it would be desirable to develop a resin that does not require a great deal of heat of effect cure. Radiation curable resins are known it the art. Offenlegungsschrift No. 1,956,810 discloses the use of radiation for the curing of unsaturated polyester resins, acid hardenable urea resins, and other synthetic resins, especially in mixtures with styrene as binder for abrasives. U.S. Pat. No. 4,047,903 discloses a radiation curable binder comprising a resin prepared by at least partial reaction of (a) epoxy resins having at least 2 epoxy groups, e.g. from diphenylolpropane and epichlorohydrin, with (b) unsaturated monocarboxylic acids, and (c) optionally polycarboxylic acid anhydride. U.S. Pat. No. 4,457,766 discloses the use of acrylated epoxy resins, which are designated therein "epoxy acrylates", such as the diacrylate esters of bisphenol A epoxy resins, as a radiation curable binder for coated abrasives.

The coated abrasive described in the foregoing patents exhibit the shortcoming of poor adhesion of abrasive granules to the backing because the binder does not cure in areas where the granules screen out radiation, unless high dosages of ionizing radiation are employed. High dosages of radiation can adversely affect the backing. The poor adhesion of the abrasive granules results in a large loss of abrasive granules, i.e. "shelling", from the backing upon flexing and grinding. Attempts to improve the adhesion of the abrasive granules by curing by ionizing radiation, e.g., electron beam, through the backside of the backing often leads to degradation of the backing.

SUMMARY OF THE INVENTION

This invention involves a coated abrasive product and a process for producing this abrasive product. The coated abrasive product comprises a backing, a make coat, a layer of abrasive grains, a size coat, and, optionally, a saturant coat, or a presize coat, or a backsize coat, or any combination of these optional coats, wherein at least one coat is formed from a composition curable by electromagnetic radiation. Surprisingly, this radiation curable composition is curably by electromagnetic radiation even in areas where abrasive granules screen out radiation. The use of the radiation curable composition of this invention overcomes the problem of poor adhesion of abrasive granules resulting from incomplete cure of the binder by combining a cationic curing mechanism with a free-radical curing mechanism. Another significant advantage of this invention is that the radiation curable binder can be cured relatively quickly to firmly anchor the deposited abrasive granules. When a heat curable phenolic resin is used as the binder for the make coat, its relatively long curing time provides ample opportunity for the abrasive granules to shift from their orientation at deposition.

The radiation curable composition suitable for use in this invention comprises a resin portion comprising ethylenically-unsaturated groups and 1,2-epoxide groups, and a photoinitiator portion, in an amount sufficient to cure the radiation curable composition, comprising at least one polymerization photoinitiator selected from the group consisting of:

(1) salts having an onium cation and a halogen-containing complex anion of a metal or metalloid, e.g., diphenyliodonium hexafluoroantimonate, and
(2) a mixture of (a) at least one salt having an organometallic complex cation and a halogen-containing complex anion of a metal or metalliod, e.g., $\eta^5$--cyclopentadienyl)tricarbonyliron(1+) hexafluoroantimonate, and (b) at least one free-radical polymerization initiator.

It is generally preferred to use a free-radical polymerization initiator in conjunction with the photoinitiator salts of the aforementioned group (1). Optionally, the photoinitiator can also contain one or more thermally activated cationic or free-radical initiators. In addition, the photoinitiator can optionally contain photosensitizers to sensitize the composition to visible light.

Preferably, the curable portion is selected from the group consisting of:

(A) at least one bireactive compound containing at least one ethylenically-unsaturated group and at least one 1,2epoxid group,
(B) at least one ethylenically-unsaturated compond and at least one compound containing at least one 1,2-epoxid group,
(C) at least one bireactive compound containing at least one ethylenically-unsaturated group and at least one 1,2epoxide group, and at least one ethylenically-unsaturated compound., (D) at least one bireactive compound containing at least one ethylenically-unsaturated group and at least one 1,2-epoxide group, and at least one compound containing at least one 1,2-epoxide group, and (E) at least one bireactive compound containig at least one ethylenically-unsaturated group and at least one 1,2-epoxide group, at least one ethylenically-unsaturated compound, and at least one compound containing at least one 1,2-epoxide group.

It is within the scope of the present invention to utilize various combinations of radiation curable resin systems with conventional heat curable resin systems. For instance, the backsize coat of a cloth substrate could be formed using radiation curable resin, and then the make and size coats formed utilizing conventional heat curable resin systems. In another case, the make coat may be formed by a radiation curable resin, while the size coat may be of a conventional heat curable resin. Thus, the radiation curing resin systems of the present invention are compatible with, and may be utilized in various combinations with conventional heat curable resins.

DETAILED DESCRIPTION

Figure 2:
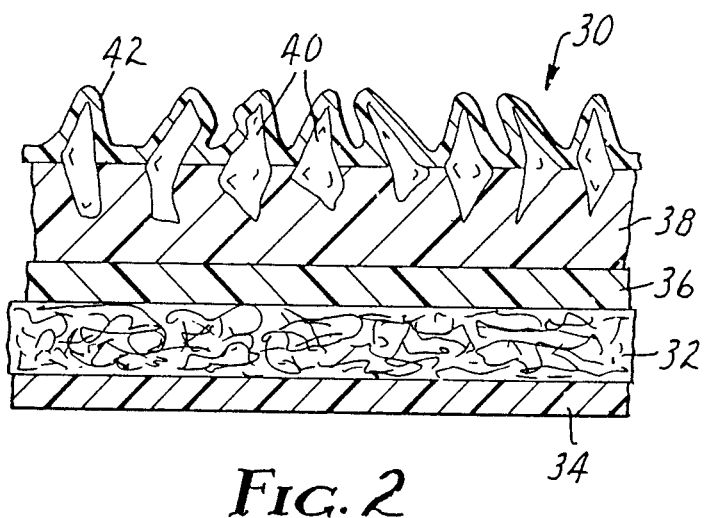
FIG. 2 illustrates in cross-section a coated abrasive on a paper backing material.
Figure 1:
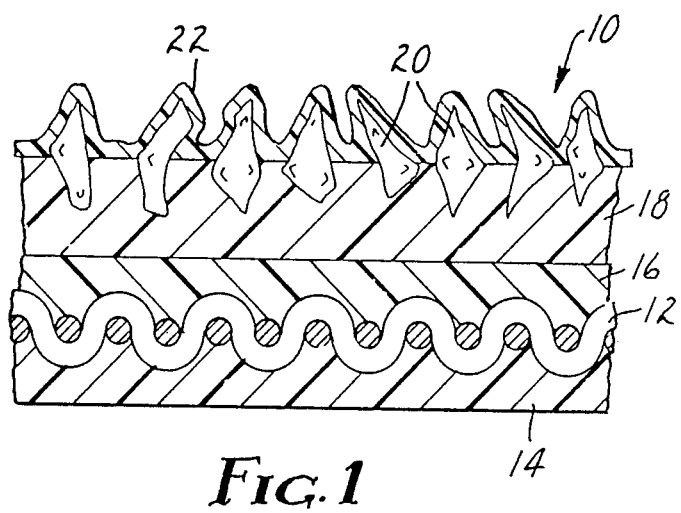
FIG. 1 illustrates in cross-section a coated abrasive on a cloth backing material.

Coated abrasives that may be produced by the resin systems of the invention are illustrated in FIGS. 1 and 2. As illustrated in FIG. 1, the coated abrasive generally indicated as 10 is cloth backed. Cloth 12 has been treated with an optional backsize coat 14 and an optional presize coat 16. Overalying the presize coat is a make coat 18 is which are embedded abrasive granules 20 such as silicon carbide or aluminum oxide. A size coat 22 has been placed over the make coat 18 and the abrasive granules 20. There is no clear line of demarcation between the backsize coat and the presize coat which meet in the interior of the cloth backing which is satruated as much as possible with the resins of these coats.

In FIG. 2 there is illustrated a coated abrasive generally indicated as 30 which is formed on a paper backing 32. Paper backing is treated with a backsize coat 34 and presize coat 36. The presize coat is overcoated with a make coat 38 in which are embedded abrasive granules 40. The abrasive granules 40 and make coat 38 are overcoated with a size coat 42 which aids in holding the abrasive granules 40 onto the backing during utilization and further may contain cutting aids.

As used herein the term, "electromagnetic radiation" means non-particulate radiation having a wavelength within the range of 200 to 700 nanometers. "Bireactive compounds" are those which contain at least one ethylenically-unsaturated group and at least one 1,2-epoxide group.

Ethylenically-unsaturated compounds that can be used in the polymerizable mixture of this invention include monomeric or polymeric compounds that contain atoms of carbon, hydrogen, and oxygen, and optionally, nitrogen and the halogens. Oxygen and nitrogen atoms are generally present in ether, ester, urethane, amide, and urea groups. The compounds preferably have a molecular weight of less than about 4000 and are preferably esters of aliphatic monohydroxy and polyhydroxy group-containing compounds and unsaturated carboxylic acids, such as acrylic acid, methacrylic acid, itaconic acid, crotonic acid, isocrotonic acid, maleic acid, and the like. Representative examples of preferred ethylenically-unsaturated compounds include methyl methacrylate, ethyl methacrylate, styrene, divinylbenzene, vinly toluene, ethylene glycol diacrylate and methacrylate, hexanediol diacrylate, triethylene glycol diacrylate and methacrylate, trimethylolpropane triacrylate, glycerol triacrylate, pentaerythritol triacrylate and methacrylate, pentaerythritol tetraacrylate and methacrylate, dipentaerythritol pentaacrylate, sorbitol triacylate, sorbital hexaacrylate, bisphenol A diacrylate, and ethoxylated bisphenol A diacrylate. Other examples of ethylenically-unsaturated compounds include ethylene glycol diitaconate, 1,4-butanediol diitaconate, propylene glycol dicrotonate, dimethyl maleate, and the like. Other ethylenically-unsaturated compounds include monoally, polyallyl, and polymethallyl esters and amides of carboxylic acids, such as diallyl phthalate, diallyl adipate and, N,N-diallyladipamide. Still other nitrogen-containing compounds include tris(2-acryloyl oxyethyl)isocyanurate, 1,3,5-tri(2-methacryloxyethyl) -s-triazine, acrylamide, methacrylamide, N-methylacrylamide, N,N-dimethylacrylamide, N-vinylpyrrolidone, and N-vinylpiperidone. It is preferred that the ethylenically unsaturated compounds be acrylic compounds because of their ready availability and high speed of cure.

Polymeric ethylenically-unsaturated compounds that can be used include the reaction products of acrylic or methacrylic acid or an isocyanato-alkyl acrylate or methacrylate with a polymeric polyether or polyester polyol. Representative example of polymeric polyols include the polyoxyalkylene polyols, i.e., the diols, triols, and tetrols, the polyester diols, triols, and tetrols formed by the reaction of organic dicarboxylic acids with polyhydric alcohols, and the polylactone diols, triols, and tetrols. Examples of polymeric polyols that are commerically available include polyoxyethylene diols, triols and tetrols, such as the Carbowax ® polyols available from Union Carbide, the polyoxytetramethylenediols, such as Polymeg ® polyols available from Quaker Oats Company, the polyester polyols such as the Multron ® poly(ethyleneadipate)polyols available from Mobay Chemical Company, the polycaprolactone polyols such as the PCP polyols available from Union Carbide, and the urethane acrylates such as "C-9504" available from ARCO Chemicals.

The 1,2-epoxide group-containing compounds that can be used in the polymerizable mixture of this invention have an oxirane ring, i.e.,

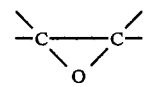

and the compound is polymerizable by ring opening. Such materials, broadly called epoxides, include monomeric epoxy compounds and polymeric epoxides, and may vary greatly in the nature of their backbones and substituent groups. For example, the backbone may be of any type and substituent groups thereon can be any group of an active hydrogen atom which is reactive with an oxirane ring at room temperature. Representative examples of acceptable substituent groups include halogens, ester groups, ether groups, sulfonate groups, siloxane groups, nitro groups, and phosphate groups. The molecular weight of the epoxy-containing materials can vary from about 60 to about 4000, and preferably range from about 100 to about 600. Mixtures of various epoxy-containing materials can be used in the compositions of this invention.

Epoxy-containing materials that are particularly useful in the practice of this invention include glycidyl ether monomers of the formula

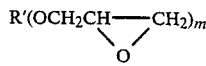

where R' is alkyl or aryl and m is an integer of 1 to 6, inclusive. Representative examples of these are the glycidyl ethers of polyhydric phenols obtained by reacting a polyhydric phenol with an excess of a chlorohydrin, such as epichlorohydrin. Specific examples of such materials include 2,2-bis[4-(2,3-epoxypropoxy)-phenyl]propane (diglycidyl ether of bisphenol A) and commercially available materials under the trade designations "Epon 828", "Epon 1004", and "Epon 1010" available from Shell from Dow Chemical Co., flame retardant epoxy rensins (e.g. "DER-580", a brominated bisphenol type epoxy resin available from Dow Chemical Co.), glycidyl ethers of phenol-formaldehyde novolac (e.g., "DEN-431" and "DEN -428" available from Down Chemical Co.), and resorcinol diglycidyl ether (e.g., "Kopoxite", available from Koppers Company, Inc.) Additional examples of epoxides of this type that can be used in the practice of this invention are described in U.S. Pat. No. 3,018,262, incorporated herein by reference, and in Lee and Neville, "Handbook of Epoxy Resins", McGraw-Hill Book Co., New York (1967).

Commercially available epoxy-containing materials useful in this invention include cycloaliphatic epoxide monomers such as the epoxycyclohexanecarboxylates, typified by 3,4-epoxycyclohexylmethyl 3,4-epoxycyclohexanecarboxylate (e.g. "ERL-4221" from Union Carbide Corp.), 3,4-epoxy-2-methylcyclohexylmethyl 3,4-epoxy-2-methylcyclohexanecarboxylate, bis(3,4-epoxy-6-methylcyclohexylmethyl) adipate, 3,4-epoxy-6-methylcyclohexylmethyl 3,4-epoxy-6-methylcyclohexanecarboxylate (e.g., "ERL-4201" from Union Carbide Corp.), vinylcyclohexene dioxide (e.g., "ERL-4206" from Union Carbide Corp.), bis(2,3-epoxycyclopentyl) ether (e.g., "ERL-0400" from Union Carbide Corp.). Other useful epoxides of this nature are disclosed in U.S. Pat. No. 3,177,099.

Additional commercially available epoxy-containing materials that can be used in the practice of this invention include octadecyl oxide, epichlorohydrin, styrene oxide, glycidol, butyl glycidyl ether, glycidyl acrylate and methacrylate, epoxy modified polypropylene glycol (e.g., "ERL-4050" and "ERL-4051", available from Union Carbide Corp.), epoxidized polybutadiene (e.g., "Oxison 2001", available from FMC Corp.), silicone resins containing epoxy functionality, and copolymers of acrylic acid esters of glycidol, such as glycidyl acrylate and glycidyl methacrylate, with one or more copolymerizable vinyl compounds, such as methyl methacrylate, vinyl chloride, and styrene. Examples of such copolymers are 1:1 styrene: glycidyl methacrylate, 1:1 methyl methacrylate:glycidyl acrylate, and 62.5:24:13.5 methyl methacrylate:ethyl acrylate:glycidyl methacrylate.

The polymeric epoxides include linear polymers having terminal epoxy groups (e.g. a diglycidyl ether of a polyoxyalkylene glycol), polymers having skeletal oxirane units (e.g. polybutadiene polyepoxide), and polymers having pendent epoxy groups (e.g. a glycidyl methacrylate polymer or copolymer). The epoxides may be isolated, individual compounds, but are generally mixtures containing one, two, or more epoxy groups per molecule. The "average" number of epoxy groups per molecule is determined by dividing the total number of epoxy groups in the epoxy-containing material by the total number of epoxy molecules present.

Bireactive compounds can be made by introducing at least one ethylenically-unsaturated group into a compound that already contains one or more 1,2-epoxide group, or, conversely, by introducing at least one 1,2-epoxide group into a compound that already contains one or more ethylenically-unsaturated group.

The bireactive compounds can be prepared by the reacting of a compound having at least two epoxide groups with a stoichiometric deficiency, based on epoxide content, of a compound containing both an ethylenically-unsaturated group and a group having an active hydrogen, such as the carboxyl (—COOH), hydroxyl- (—OH), mercapto(—SH), or amido

group. This method of preparation generally yields no more than fifty percent of the bireactive compound. Thus, reaction of one mole of a diepoxide and one mole of acrylic acid would yield a product, consisting of 50 mole percent of an epoxy acrylate compound having both an acrylic group and an epoxy group, 25 mole percent of a diacrylate, and 25 mole percent of unchanged diepoxide on a statistical basis. With lesser or greater amounts of acrylic acid, there would be obtained lesser or greater amounts of the diacrylate and the diepoxide but in each, a lesser amount of the epoxy acrylate.

Specifically, bireactive compounds are the reaction product of an aromatic, alkyl, cycloalkyl, or alkaryl compound having n 1,2-epoxy groups (in which n is a number having a value of 2 to 10 or more) with 0.2 n to 0.9 n equivalents of ethylenically-unsaturated compound having an active hydrogen group.

Preferred bireactive compounds are those contained in the reaction products of an acrylic acid (the term "an acrylic acid" is used generically to include acrylic acid, methacrylic acid, and α-chloroacrylic acid) with a cycloalkyl, aryl, or alkaryl polyepoxy compound having n 1,2-epoxy groups wherein n is defined hereinabove. Examples of such preferred bireactive compounds are those contained in the reaction products of 0.4 to 0.6 weight equivalents of an acrylic acid and one mole of diglycidyl ether of bisphenol A (DGEBA), polyglycidyl ether of phenol-formaldehyde novolac, polyglycidyl ether of cresol-formaldehyde novolac, diglycidyl terephthalate, triglycidyl ester of trimellitic acid, dicyclopentadiene dioxide, vinylcylohexene dioxide, bis(2,3-epoxycyclopentyl)ether, 3,4-epoxycyclohexylmethyl 3,4-epoxycyclohexanecarboxylate, and bis(3,4-epoxy-6-methylcyclohexyl)methyl adipate.

The photoinitiators of group (1), i.e., salts of an onium cation and a halogen-containing complex anion of a metal or metalloid are adducts of (1) an aromatic organoatomic cation of a Periodic Group VA, VIA, or VIIA atom, recently given the notation of Groups 15, 16, and 17 in Chem. & Eng. News. Vol. 63, No. 5, 26 (Feb. 4, 1985), particularly phosphorous, antimony, sulfur, nitrogen, chlorine, and iodine atoms, and (2) an anion. The Group 15, 16 and 17 atom from which the salt derives its name (e.g., phosphorus in phosphonium, sulfur in sulfonium, iodine in iodonium, etc.) is referred to hereafter as the nominative atom. The term "aromatic", as used in the description of the groups on the photoinitiator means an aromatic ring which can be carbocyclic or a 5-, 6- or 7-membered heterocyclic ring wherein the ring atoms comprise carbon and one or more atoms selected from the group consisting of N, S, O, and Se atoms so attached to the nominative atoms that the aromatic ring is at least as electron withdrawing as phenyl. For

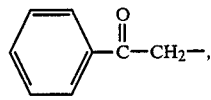

example,
phenacyl, would be a useful aromatic group, because it is at least as electron withdrawing as phenyl, but benzyl,

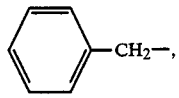

would not be useful because of instablility of the compound therof. Representative examples of aromatic rings are phenyl, naphyhyl, thienyl, pyranyl, furanyl, and pyrazolyl, either substituted or unsubstituted.

The onium salt photoinitiators useful in the practice of this present invention can be represented by the formula:

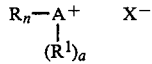

wherein
R represents an aromatic group at least as electron withdrawing as phenyl;
R¹ represents either an aromatic group or a straight chain, branched, or cyclic alkyl or alkenyl group having, for example, 1 to 19 carbon atoms;
A represents an atom of the Periodic Group 15, 16, or 17;
n represents a positive integer having a value of at least 2 (preferably 2) up to the valence of A plus one;
a represents zero or a positive integer of up to the valence of A plus one; and
X represents a halogen containing complex anion of a metal or metalloid.

U.S. Pat. No. 4,026,705, 4,032,673, 4,069,054, 4,136,102 and 4,173,476, all of which are incorporated herein by reference, show the use of certain onium compounds as cationic polymerization catalysts for specific monomers such as organosilicon cyclics, vinyl resins, cyclic ethers, cyclic esters, cyclic sulfides, epoxy resins, phenolic resins, polyamines, lactones, styrene, urea/formaldehyde resins, and melamine/formaldehyde resins.

The organo groups may also be directly linked one to another via a covalent bond, a methylene group, a

group, an —SO₂—group, and oxygen atom, a sulfur atom, or the like. One or more of the organo groups can share two atoms in a condensed ring system.

Representative examples of onium salts that are useful in the practice of the present invention include:

A. Onium salts having as nominative atom a Periodic Group 15 cation: diphenylmethylammonium tetrafluoroborate, tetraphenylphosphonium hexafluorophosphate, (4-bromophenyl)triphenylphosphonium hexafluorophosphate, tetraphenylarsonium tetrafluoroborate, tetraphenylammonium hexafluorophosphate, di(1-naphthyl)dimethylammonium tetrafluoroborate, tri-(3-thienyl)methylammonium tetrafluoroborate, and diphenacyldimethylammonium hexafluorophosphate. These and other onium salts and the preparation thereof are disclosed in Belgium Pat. No. 828,668.

B. Onium salts having as nominative atom a Periodic Group 16 cation: triphenylsulfonium hexafluoroantimonate, 4-chlorophenyldiphenylsulfonium tetrafluoroborate, 4-chlorophenyldiphenylsulfonium hexafluorophosphate, triphenyltelluronium pentachlorobismuthate, and triphenylselenonoium hexafluoroantimonate. These and other onium salts having as nominative atom a Periodic Group 16 cation and the preparation thereof are disclosed in Belgium Pat. Nos. 828,670 and 833,472 and U.S. Pat. No. 4,256,825.

C. Onium salts having as nominative atom a Periodic Group 17 cation: diphenyliodonium hexafluorophosphate, 4-chlorophenylphenyliodonium hexafluoroantimonate, diphenyliodonium hexafluoroarsenate, 4-trifluoromethylphenylphenyliodonium tetrafluoroborate, di(4-methoxyphenyl)iodonium hexafluoroarsenate, 4-methylphenylphenyliodonium tetrafluoroborate, diphenylbromonium hexafluorophosphate, and 2,2'-biphenyliodonium hexafluorophosphate. These and other halonium salts and the preparation thereof are disclosed in Belgium Pat. No. 828,669 and U.S. Pat. No. 4,256,828.

Photoinitiator salts having an organometallic complex cation and a halogen containing complex anion of a metal or metalloid are salts in which the cation is capable of adding an intermediate strength nucleophile (e.g. triphenylphosphine) or, upon photolysis, is capable of liberating at least one coordination site. The metal of the organometallic complex cation can be selected from elements of Periodic Groups IVB, VB, VIB, VIIB, and VIIIB, recently given the notation of Groups 4, 5, 6, 7, 8, 9, and 10 by Chem. & Eng. News, supra. Examples of such ionic salts and the preparation thereof are disclosed in assignee's copending patent application U.S. Ser. No. 443,660, filed Nov. 22, 1982 incorporated herein by reference.

Preferred salts for use in the practice of this invention can be represented by the formula:

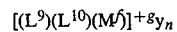

wherein

M$^f$ represents a metal selected from the group consisting of Cr, Mo, W, Mn, Re, Fe, and Co;

L$^9$ represents 1 or 2 π-electron-contributing ligands that can be the same or different, said ligands being selected from substituted and unsubstituted η3-allyl, η5-cyclopentadienyl, and η7-cycloheptatrienyl and η6-aromatic compounds selected from η6-benzene compounds and compounds having 2 to 4 fused rings, each capable of contributing 3 to 8 π-electrons to the valence shell of M$^f$;

L$^{10}$ represents none or 1 to 3 ligands that can be the same or different said ligands contributing an even number of σ-electrons and selected from carbon monoxide or nitrosonium;

q represents an integer having a value of 1 or 2, the residual electrical charge of the complex caton;

y represents a halogen-containing complex anion selected from the group consisting of AsF$_6$, SbF$_6$ and SbF$_5$OH, and n represents an integer having a value of 1 or 2, the number of complex anions required to neutralize the charge q on the complex cation; with the proviso that the total electronic charge contributed to M$^f$ by L$^9$ and L$^{10}$ plus ionic charge on metal M$^f$ results in a net residual positive charge of q to the complex.

Representative examples of salts of organometallic complex cations useful in the practice of the present invention include the following:

(η5-cyclopentadienyl)tricarbonyliron(1+) hexafluorophosphate (η6-mesitylene)(η5-cyclopentadienyl)iron(1+) hexafluoroantimonate (η5-cyclopentadienyl)carbonylbis(triphenylstibine)iron(1+) hexafluorophosphate (η5-methylcyclopentadienyl)dicarbonylnitrososylmanganes(1+) hexafluoroantimonate (η5-cyclopentadienyl)tetracarbonylmolybdenum(1+) hexafluorophosphate (η5-cyclopentadienyl)dicarbonylmethylisonitrileiron(1+) hexafluoroarsente bis(η6-benzene)chromium(1+) hexafluoroantimonate bis(η6-hexamethylbenzene)cobalt(2+) hexafluoroantimonate bis(η6-mesitylene)iron(2+) bis(hexafluoroantimonate).

Other examples of salts of organometallic complex cations useful in the practice of this invention are described in the above-mentioned patent application U.S. Ser. No. 443,660.

The salts of group (2) photoinitiators requrie the use of a free-radical polymerization initator. It is preferred to use a free-radical polymerization initiator with the salts of group (1) photoinitiators Representative examples of free-radical generating compounds that can be activated by thermal energy or by light energy are organic peroxides, azo compounds, quinones, benzophenones, nitroso compounds, acyl halides, aryl halides, hydrazones, mercapto compounds, pyrylium compounds, triarylimidazoles, bisimidazoles, chloroalkyltriazines, benzoin ethers, benzil ketals, thioxanthones, and acetophenone derivatives. Additional reference to free-radical photoinitiator systems for ethylenically-unsaturated compounds are included in U.S. Pat. No. 3,887,450 (e.g., col 4) and U.S. Pat. No. 3,895,949 (e.g., col. 7). Other desirable photoinitiators are chloroalkyltriazines as disclosed in U.S. Pat. No. 3,775,113. Another good reference to free-radical photoinitiator systems is J. Kosar, *Light-Sensitive Systems*, J. Wiley and Sons, Inc. (1965), especially Chapter 5.

A radiation curable composition that has been found to be useful in the present invention is that described in U.S. Pat. No. 4,156,035. Although it is asserted that this composition is useful for providing photoresists, and, as such, would not be expected to be curable in the absence of direct exposure to electromagnetic radiation, it has been discovered that, in the case of coated abrasives, this composition can be sufficiently cured by eletromagnetic radiation even in areas where abrasive granules screen out radiation to firmly secure abrasive granules to the backing.

A sufficient amount of polymerization photoinitiator must be used to cure the composition. Generally, the total amount of photoinitiator in the radiation curable composition of the present invention can range from a concentration of 0.05 to 10, preferably 0.1 to 5, parts by weight per 100 parts by weight of total composition. When a mixture of cationic polymerization initiators and free-radical polymerization initiators is used, the mixture comprises about 5 to 50 percent, preferably 15 to 30 percent, by weight of cationic polymerization initiator, and 95 to 50 percent, preferably 85 to 70 percent, by weight of free-radical polymerization initiator.

The photoinitiator salts usedful in the radiation curable compositions of this invention are themselves generally photosensitive in the ultraviolet portion of the electromagnetic spectrum, i.e., about 200 to 400 nm. It is within the scope of this invention to include spectral sensitizers, i.e., compounds that extend the sensitivity of the photoinitiator salts into the visible range of the spectrum (up to about 700 nm). Spectral sensitizers that can be used are known in the art and include polycyclic compounds such as the polyarylens, polyarylpolyenes, 2,5-diphenyl-isobenzofurans, 2,5-diarylcyclopentadienes, diraylfurans, diarylthiofurans, diarylpyrrols, polyarylphenylenes, coumarins, and polyaryl-2-pyrazolines.

Examples of preferred spectral sensitizers are: 9,10-diethoxyanthracene, perylene, 2-isoprpylthioxanthone, phenothiazines, 1,1,4,4-tetraphenyl-1,3-butadiene, 1,3-diphenyl-2-pyrazoline, 1,3-diphenylisobenzofuran, 7-dimethylamine-4-trifluoromethylcoumarin, Setoflavin T (C.I. No. 49005), Acridine Red (C.I. No. 45000), and Acridine Orange (C.I. No. 46055). Other spectral sensitizers that can be used are described in U.S. Pat. Nos. 3,729,313, 4,026,705, and 4,307,177, which are incorporated herein by reference. If a spectral sensitizer is used. about 0.001 to 0.2 part of spectral sensitizer is used per part by weight of polymerization photoinitiator.

The thermally activated cationic polymerization initiators that can optionally be used in the composition of the present invention are generally salts or complexes of Lewis acids and Bronsted acids, such as hydrofluoric acid, boron trifluoride, antimony pentafluoride, hexafluoroantimonic acid, and the like, with an amine. If a Lewis acid or Bronsted acid were used alone as the cationic polymerization initiator of a cationically polymerizable material, the resin composition would have a pot life entirely too short to be useful in the preparation of coated abrasives. By the addition of an amine to the Lewis acid, particularly an aliphatic amine, such as ethylenediamine or morpholine, a salt of complex of the Lewis acid and amine is formed and the properties of the Lewis acid modified so that the pot life of the resin composition containing the salt or complex will be lengthened. by application of heat to the resin composition, the modified Lewis acid is thermally activated and the polymerization of the resin composition initiated.

Examples of modified or latent Lewis acid initiators that can be used in the resin system of the invention are the amine complexes of phosphorous pentafluoride, the primary aliphatic amine complexes with antimony pentafluoride as are disclosed in U.S. Pat. No. 3,565,861, the hydroxyl ammonium hexafluoroantimonate disclosed in U.S. Pat. No. 3,879,312, and the amine salts of hydrofluoroboric acid disclosed in U.K. Pat. Spec. No. 963,058.

Preferred thermally activated cationic initiators for use in the resin composition of the present invention are the modified Bronsted acid curing agent disclosed in U.S. Pat. No. 4,503,211. This initiator comprises a liquid salt formed from a substituted pentafluoroantimonic acid and aniline or a hindered aromatic amine, such as 2-methylaniline and 2-isopropylaniline. The substituted pentafluoroantimonic acid has the formula $HSbF_5X$, wherein X represents halogen, hydroxy, or the residue of an aliphatic or aromatic alcohol, preferably diethylene glycol.

The resin composition of the present invention can contain fillers, lubricants, and minor amounts of other additives such as surfactants, pigments, and suspending agents. The amounts of these materials are selected to give the properties desired.

The fillers can be selected from any filler material which does not adversely affect the characteristics of the resin composition. Preferred fillers include calcium carbonate, calcium oxide, aluminum sulfate, aluminum trihydrate, barium sulfate, cryolite, magnesia, kaolin, quartz, and glass. Fillers that function as cutting aids are cryolite, potassium fluoroborate, feldspar, and sulfur. The fillers can be used in amounts up to about 250 parts, preferably from about 30 to about 150 parts, per 100 parts of polymerizable composition while retaining good flexibility and toughness of the cured resin composition.

The radiation curable resin composition useful in the practice of the present invention can be prepared by mixing the curable portion and the photoinitiator portion. If the curable portion comprises more than one type of compound, these compounds can be added to the mixture in any order. It is preferred that there be present in the composition at least 0.2 equivalent of ethylenically-unsaturated, preferably acrylic, groups present in ethylenically-unsaturated compounds or bireactive compounds and at least 0.05 equivalent of 1,2-epoxide groups present in 1,2-epoxide group-containing compounds or bireactive compounds for each 100 grams of total composition.

The backing, as previously mentioned, can be paper cloth, vulcanized fiber, film, or any other backing material known for this use. The radiation curable composition can be used to treat the backing material, e.g., cloth, paper, or plastic sheeting, to saturate of provide a back or front coat thereto, to provide a make coat to which abrasive granules are initially anchored, or to provide a size or reinforcing coat for tenaciously holding the abrasive granules to the backing material. The abrasive granules can be of any conventional grade of mineral utilized in the formation of coated abrasives, including natural or synthetic materials such as, for example, flint, garent, aluminum oxide, alumina:zirconia, diamond and silicon carbide, and ceramic minerals such as modified aluminum oxide, available as Cubitron from Minnestoa Mining and Manufacturing Company, and mixtures thereof. The abrasive layer may further include non-abrasive diluent particles. The frequency of the abrasive granules on the sheet will also be conventioal. The abrasive granule may be oriented or may be applied to the backing without orientation, depending upon the requirement of the particular coated abrasive product.

In another embodiment of the present invention, abrasive granules can be adhered to the backing by means of a single binder coat of the radiation curable resin composition described herein. In this embodiment, it is preferred that the abrasive granules be no larger than grade 220.

The radiation curable resin composition for coated abrasives according to the present invention cures rapidly, i.e. less than 5 minutes; consequently, prolonged heating and dwell times before subsequent coating, are avioded. Unlike glue and phenolic resin compositions, the resin composition of the present invention is relatively unaffected by moisture. Unlike varnish, the resin composition of the invention can be applied with little or no solvent. This characteristic renders the composition particularly useful for preparing the make coat, because the rapid cure insures that the orientation of the abrasive granules will no shift as the make coat is being cured.

The coated abrasive product of the present invention may also include such modifications as are known in this art. For example, a back coating such as a pressure-sensitive adhesive may be applied to the backing and various supersizes may be applied to the abrasive surface. For example, zinc steartae can be used to prevent abrasive loading.

The following, non-limiting examples will further illustrate this invention. Unless other wise noted, all parts and percentages are in terms of weight. In the following examples, the trademarks and suppliers of the following compounds were as follows:

| COMPOUND | TRADEMARK |
| --- | --- |
| pentaerythritol triacrylate | "SR-444", ARCO Chemicals |
| diglycidyl ether of bisphenol A | "Epon 828", Shell Chemical Co. |
| quartz filler | "IMSIL A1OE", Illinois Mineral Co. |
| diglycidyl ether of 1,4-butanediol | "Araldite RD-2", Ciba-Geigy |
| butyl glycidyl ether | "Araldite RD-1", Ciba-Geigy |
| triphenylsulfonium hexafluorophosphate in $\gamma$-butyrolactone | "FX-512", Minnesota Mining and Manufacturing Co. |
| 2,2-dimethoxy-1,2-diphenyl-1-ethanone | "Irgacure 651", Ciba-Geigy |
| 2-isopropylthioxanthone | "2-ITX", Aceto Chemical Co. |
| ethoxylated bisphenol A diacrylate | "SR-349", ARCO Chemicals |
| 1,6-hexanediol diacrylate | "SR-238", ARCO Chemicals |
| trimethylolpropane triacrylate | "SR-351", ARCO Chemicals |
| a $C_{14}$-$C_{15}$ linear aliphatic diacrylate | "C-2000", ARCO Chemicals |
| an aliphatic urethane acrylate | "C-9504", ARCO Chemicals |
| cycloaliphatic epoxide | "Cyracure 6110", Union Carbide |
| cycloaliphatic epoxide | "Cyracure 6100", Union Carbide |
| epoxy-based flexibilizing agent | "Cyracure 6379", Union Carbide |
| triacrylate ester of tris-(hydroxyethyl)isocyanurate | "SR-368", ARCO Chemicals |
| neopentyl glycol diglycidyl ether | "Heloxy WC-68", Wilmington Chemical Corp. |
| resorcinol diglycidyl ether | "Denacol EX-201", Nagase Chemical Co. |
| 1,4-bis(hydroxymethyl)cyclohexane diglycidyl ether | "Heloxy MK-107", Wilmington Chemical Corp. |
| urea-formaldehyde | "Varcum 404B", Reichhold |

| -continued | |
|---|---|
| COMPOUND | TRADEMARK |
| cresyl glycidyl ether | Chemicals, Inc. "Araldite DY023", Ciba-Geigy |

EXAMPLE 1

This example illustrates the preparation of coated abrasives utilizing the electromagnetic radiation curable resin composition of the present invention.

Backing material of vulcanized fiber (30 mil) was primed by brush coating with a composition consisting of (a) 100 parts by weight of the reaction product of one mole of diglycidyl ether of 1,4-butanediol, with one mole of acrylic acid, hereinafter Bireactive No. 1, (b) 1.3 parts of diphenyliodonium hexafluorophosphate, and 0.13 parts of 9,10-diethoxyanthracene. The coating weight was 1.2 g/m$^2$ (0.29 grains/24 sq. in.) The primed backing was cured in air in an RPC Processor Model #QC1202 ANIR (from PPG, Inc.) at 30 cm/sec (60 ft/min) with two standard medium pressure mercury lamps operating at 40 watts per centimeter (100 watts per inch). The lamps were located at a distance of about 9,5 cm from the backing.

The backing bearing the cured primer was then brush coated with composition UV-1, a composition consisting of:
55 parts pentaerythritol triacrylate
40 parts the reaction product of one mole of diglycidyl ether of bisphenol A with one mole of acrylic acid (hereinafter Bireactive No. 2)
5 parts butyl glycidyl ether as a reactive diluent
100 parts quartz filler
0.46 part of 60% solution of triphenylsulfonium hexafluorophosphate in γ-butyrolactone
1.50 parts 2,2-dimethoxy-1,2-diphenyl-1-ethanone. The coating weight was 280 g/m$^2$ (67 grains/24 sq. in.)

This "make" coated primed backing was then drop coated with 739 g/m$^2$ (180 grains/24 sq. in.) of Grade 50 Al$_2$O$_3$ mineral and the "make" coat cured by four passes at 30 cm/sec in air in the RPC Processor with two lamps at 120 watts per centimeter.

Over the mineral and cured "make" coats was brush coated composition UV-2, a composition consisting of
40 parts pentaerythritol triacrylate
30 parts Bireactive No. 2
30 parts N-vinyl-2-pyrrolidone (hereinafter NVP) available from GAF
100 parts quartz filler
0.46 part of 60% solution of triphenylsulfonium hexafluorophosphate in γ-butyrolactone
1.50 parts 2,2-dimethoxy-1,2-diphenyl-1-ethanone.
The coating weight was 293 g/m$^2$. The sized construction was heated to 100° C. by means of an infrared heater and cured in air by six passes throught the RPC Processor at 30 cm/sec with two lamps set at 120 watts per centimeter. The cured article was cut to form 23 cm diameter abrasive discs, the performances of which were determined in accordance with the following procedure. The discs were installed in a slide action testing machine. The work piece was 1018 steel at a loading pressure, at the grinding interface, of 0.70 kg/cm$^2$. The average weights in grams for initial, final and total cuts are showns in Table I.

COMPARATIVE EXAMPLE A

This example illustrates a conventional method of making abrasive sheet material.

Vulcanized fiber backing was coated with conventional phenol-formaldehyde resole resin make coat at a coating weight of 280 g/m$^2$. The phenolic make coat was then drop coated with 740 g/m$^2$ of grade 50 Al$_2$O$_3$ mineral. The make coat was then partially cured by heating in an oven at 88° C. for four hours. The construction was then size coated with the same phenol-formaldehyde resole resin used for the make coat at a coating weight of 220 g/m$^2$. The abrasive coated construction was then thermally cured by heating in an oven at 88° C. for 12 hours. The cured conventional abrasive sheet material was cut into 23 cm abrasive discs, the abrasive performance of which was determined according to procedures described in Example 1. The average weights in grams for the initial, final, and total cuts are shown in Table I.

EXAMPLE 2

The procedure of Example 1 was repeated with the exception that as size coat the composition UV-3 was used in place of the composition UV-2. The composition UV-3 consisted of:
10 parts pentaerythritol triacrylate
50 parts of an experimental diacrylated epoxy resin from Celanese Speciality Resins
40 parts NVP
150 parts calcium carbonate
3 parts 2,2-dimethoxy-1,2-diphenyl-1-ethanone The cured article was cut to form 23 cm diameter abrasive discs, the performances of which were determined in accordance with the procedure described in Example 1. The average weights in grams for initial, final, and total cuts are shown in Table I.

EXAMPLE 3

This example illustrates the use of conventional make coat and the radiation curable size coat of the present invention in the preparation of abrasive sheeting.

Vulcanized fiber backing was coated with phenolic resin, drop coated with mineral, and cured as described in Comparative Example A. The construction was then size coated with composition UV-2 and cured as described in Example 1. The cured construction was cut into 23 cm diameter abrasive discs, the performance of which was determined according to procedures described in Example 1. The average weights in grams for initial, final and total cuts are shown in Table I.

EXAMPLE 4

This example illustrates the use of the radiation curable make coat of this invention and a conventional phenolic resin for the size coat in the preparation of abrasive sheeting.

The procedure of Example 1 was repeated using in place of size coat composition UV-2 the phenolic size coat as described in Comparative Example A. The coating weight was 230 g/m$^2$. The cured construction was cut into 23 cm abrasive discs, the performance of which was determined according to procedures described in Example 1. The average weights for initial, final and total cuts are shown in Table I.

TABLE I

| Example | Make coat | Size coat | Abrasive cutting performance (g) | | |
|---|---|---|---|---|---|
| | | | Initial | Final | Total |
| 1 | UV-1 | UV-2 | 24.1 | 2.3 | 109 |
| 2 | UV-1 | UV-3 | 22.8 | 1.4 | 110 |
| 3 | Phenolic | UV-2 | 22.9 | 3.6 | 143 |
| 4 | UV-1 | Phenolic | 26.7 | 3.1 | 135 |
| A* | Phenolic | Phenolic | 20.4 | 2.9 | 115 |

*Comparative example which was cured for 16 hours at 88° C.

It can be seen from Table I that when electromagnetic radiation cured coats are used in the preparation of abrasive discs, the abrasive performance is about equivalent to that of conventionally prepared abrasive discs. Yet, the preparation is accomplished without the need for the long heating period used for curing of resin compositions used in the preparation of conventional abrasive discs.

EXAMPLES 5-8

These examples illustrate the use of various diluent monomers in the electromagnetic radiation curable compositions of the present invention.

The procedure of Example 1 was repeated using as backing spun polyester cloth having a 4/1 weave and a weight of 270 g/m² in place of the vulcanized fiber. The polyester cloth was saturated with a composition of 85 parts of an acrylated epoxy resin ("Celrad 3500" from Celanese), 5 parts of NVP, 10 parts of pentaerythritol triacrylate, and 1.5 parts of 2,2-dimethoxy-1,2-diphenyl-1-ethanone. The coating weight was 146 g/m².

The saturated cloth was cured by four passes at 30 cm/sec in air in the RPC Processor having four standard medium pressure mercury lamps set at 120 watts/cm. The lamps were located at a distance of about 9.5 cm from the backing. The cured saturated cloth was backsized with a composition comprising 75 parts "Celrad 3500" resin, 15 parts NVP, 10 parts pentaerythritol triacrylate, 100 parts of calcium carbonate, and 1.0 part of free-radical initiator ("Irgacure 651"). The coating weight was 63 g/m². The backsize was cured under the same conditions as was the saturant except that a nitrogen atmosphere was used instead of air. The primed, backsized polyester backing was coated by means of knife coating with composition UV-1 at a coat weight of 151 g/m², electrostatically coated with 377 g/m² of grade 80 Al₂O₃ mineral, and cured in air using four passes at 7.5 cm/sec under a Fusion Model F450 lamp operated at 120 watts/cm. The lamps were located at a distance of about 7.6 cm from the backing. In Example 5, the cured make coated and mineral coated sheet material was size coated with composition UV-1. In Examples 6, 7 and 8, the butyl glycidyl ether diluent of composition UV-1 was replaced with equivalent weight percentages of the diluents styrene, cresyl glycidyl ether, and NVP, respectively, and size coated at the coating weights shown in Table II. Included in each composition was a latent thermal cationic polymerization initiator, designated SbF₅.DEA.DEG, the adduct of antimony pentafluoride with 2,6-diethylaniline and diethylene glycol (1.0 part). Each coating was cured under the same conditions as used to cure the make coat. Each cured abrasive coated construction was cut into strips and converted to endless belts that were subjected to belt grinding tests on 1018 steel at 1.06 kg/cm² (15 lb/in²) loading pressure.

The abrasive performance of each belt is shown in Table II.

TABLE II

| Example | Reactive diluent | Size coat (g/m²) | Abrasive cutting performance (g) | | |
|---|---|---|---|---|---|
| | | | Initial | Final | Total |
| 5 | butyl glycidyl ether | 611 | 37 | 19 | 491 |
| 6 | styrene | 311 | 39 | 19 | 486 |
| 7 | cresyl glycidyl ether | 352 | 39 | 18 | 473 |
| 8 | NVP | 289 | 38 | 19 | 490 |

Examples 5-8 show that effective grinding performance was obtained not only with ethylenically unsaturated monomers, styrene (Example 6) and NVP (Example 8) but also with epoxy monomers, butyl glycidyl ether (Example 5) and cresyl glycidyl ether (Example 7).

EXAMPLES 9-10

These examples compare the grinding performance of abrasive materials prepared using radiation curable compositions UV-4 and UV-5. Composition UV-4 contained both epoxy and acrylic groups in different molecules and composition UV-5 contained epoxy and acrylic groups in the same molecule.

Composition UV-4 contained the following ingredients:
55 parts pentaerythritol triacrylate
20 parts diglycidyl ether of bisphenol A
20 parts diacrylate of diglycidyl ether of bisphenol A
5 parts butyl glycidyl ether
1.5 parts 2,2-dimethoxy-1,2-diphenyl-1-ethanone
0.58 part diphenyliodonium hexafluorophosphate
0.058 part 2-isopropylthioxanthone
100 parts quartz filler
Composition UV-5 contained the same ingredients as composition UV-4 except that 20 parts of diglycidyl ether of bisphenol A and 20 parts of the diacrylate of diglycidyl ether of bisphenol A were replaced with 40 parts of Bireactive No. 2.

One portion of the polyester cloth primed and backsized as described in Examples 5-8 was coated by means of knife coating with composition UV-4 (Example 9) as make coat, at a coating weight of 172 g/m², coated electrostatically with grade 50 Al₂O₃ at a coating weight of 456 g/m², and cured using four passes under a Fusion Model F450 lamp in air. The lamps were located at a distance of about 7.6 cm from the backing. Composition UV-4 was coated over the make coat and abrasive coat, by means of roll coater, at a coating weight of 368 g/m² as size coat, and cured under the same conditions as used for curing the make coat. Another portion of the polyester cloth primed and backsized as described in Examples 5-8 was coated by means of knife coating with composition UV-5 (Example 10) at a coating weight of 159 g/m², coated electrostatically with grade 50 Al₂O₃ at a coating weight of 456 g/m², cured using four passes under a Fusion lamp in air. Composition UV-5 was coated over the make coat and abrasive coat, by means of roll coater, at a coating weight of 318 g/m² as size coat, and cured under the same conditions as used for curing the make coat.

Each abrasive coated construction was cut into strips and converted to endless belts that were subjected to belt grinding tests on 4150 steel at 1.76 kg/cm² loading pressure. The results obtained are shown in Table III.

TABLE III

| Example | Abrasive cutting performance (g) | | |
|---|---|---|---|
| | Initial | Final | Total |
| 9 | 94 | 42 | 1223 |
| 10 | 93 | 38 | 1157 |

The results of Examples 9 and 10 show that essentially the same cutting capability is obtained with abrasive belts prepared using make coat and size coat having acrylic and epoxy groups in either the same or in different molecules.

EXAMPLE 11

This example illustrates the use of aliphatic bireactive material in addition to aromatic bireactive material in abrasive constructions. Composition UV-6 contained the following ingredients:

25 parts ethoxylated bisphenol A diacrylate
12.5 parts pentaerythritol triacrylate
50 parts Bireactive No. 2
12.5 parts Bireactivre No. 1
0.8 part diphenyliodonium hexafluorophosphate
0.08 part 9,10-diethoxyanthracene
0.92 part 2,2-dimethoxy-1,2-diphenyl-1-ethanone C weight paper was coated by means of knife coating at a thickness of 0.025 mm to form the make coat, electrostatically coated with grade 180 SiC at a coating weight of 121 g/m², and radiation cured by 4 passes through the RPC Processor at 30 cm/sec in air with two standard medium pressure mercury lamps set at 120 watts/cm. The lamps were located at a distance of about 9.5 cm from the backing. A size coat of composition UV-6 was then coated over the make coat and abrasive coat by roll coater at 50 g/m² and radiation cured under the same conditions as used for curing the make coat, except curing was conducted under nitrogen instead of air.

The cured coated abrasive sheet was cut into samples, which were installed in a Schrieffer testing machine for evaluation. These samples were compared to commercially available coated abrasive samples of the same abrasive grade ("Tri-M-ite WetorDry Paper" available from Minnesota Mining and Manufacturing Company). The work piece was made of "Plexiglas" acrylate and the results are shown in Table IV.

TABLE IV

| Example | Amount of cut (g) |
|---|---|
| Control | 2.09 |
| 11 | 1.99 |

EXAMPLES 12-17

Electromagnetic radiation curable compositions as shown in Table V were prepared by mixing the listed ingredients in the amounts indicated.

TABLE V

| Components | Radiation curable composition (parts by weight) | | | | | | | |
|---|---|---|---|---|---|---|---|---|
| | UV-7 | UV-8 | UV-9 | UV-10 | UV-11 | UV-12 | UV-13 | UV-14 |
| Pentaerythritol triacrylate | 25 | 25 | — | 12.5 | — | 12.5 | — | — |
| 1,6-Hexanediol diacrylate | 25 | 25 | — | 25 | — | 25 | — | — |
| Ethoxylated bisphenol A diacrylate | — | — | — | 62.5 | — | 62.5 | — | — |
| Trimethylolpropane triacrylate | — | — | 10 | — | — | — | 10 | — |
| A $C_{14}$-$C_{15}$ linear aliphatic diacrylate | — | — | 20 | — | — | — | 40 | 25 |
| An aliphatic urethane acrylate | — | — | 35 | — | — | — | — | — |
| Dipentene | — | — | — | — | 17 | — | — | — |
| Cycloaliphatic epoxide[a] | — | — | 35 | — | — | — | 10 | 50 |
| Butyl glycidyl ether | — | — | — | — | — | — | 35 | — |
| Epoxy-based flexibilizing agent | — | — | — | — | — | — | — | 25 |
| Diglycidyl ether of bisphenol A | 50 | 50 | — | — | 80 | — | — | — |
| Diphenyliodonium hexafluorophosphate | 3.0 | 0.76 | 3.0 | — | — | — | 3.0 | 3.0 |
| 2-Isopropylthioxanthone | 0.3 | 0.076 | 0.3 | — | — | — | 0.3 | 0.3 |
| 2,2-Dimethoxy-1,2-diphenyl-1-ethanone | — | 0.88 | — | 1.8 | — | — | — | — |
| $SbF_5$.DEA.DEG[b] | — | — | — | — | 3.0 | — | — | — |
| FC-431[c] | — | — | — | 0.1 | — | — | — | — |
| Trimethylolpropane | — | — | — | — | — | — | 5 | — |

[a]"Cyracure 6110", Union Carbide Corp.
[b]The adduct of antimony pentafluoride with 2,6-diethylaniline and diethylene glycol
[c]Fluorocarbon surfactant from Minnesota Mining and Manufacturing Co.

Abrasive constructions were prepared using compositions UV-7 through UV-9 as make coats and compositions UV-10 through UV-14 as size coats.

The make coat and mineral coat were applied and cured in the same manner as in Example 11. The size coat was applied at a coating weight of 38 g/m². Size coats of compositions UV-10, UV-13, and UV-14 were cured with a RPC Processor #QC1202 ANIR, at 30 cm/sec. with 4 passes, with two standard medium pressure mercury lamps set at 120 watts/cm, under a nitrogen atmosphere. The lamps were located at a distance of about 9.5 cm from the backing. The size coat of composition UV-12 was cured by electron beam at 12.5 cm/sec., 5 Mrad, and 230 KeV. The size coat of composition UV-11 was thermally cured at 150° C. for 5 minutes.

The samples were tested in a Schieffer testing machine in the same manner as in Example 11. The results are shown in Table VI.

TABLE VI

| Example | Make coat | Size coat | Amount of cut (g) |
|---|---|---|---|
| 12 | UV-7 | UV-12 | 1.936 |
| 13 | UV-7 | UV-10 | 1.880 |
| 14 | UV-7 | UV-11 | 1.874 |
| 15 | UV-8 | UV-10 | 1.638 |
| 16 | UV-9 | UV-13 | 1.648 |
| 17 | UV-9 | UV-14 | 2.005 |

EXAMPLES 18-20

Radiation curable compositions as shown in Table VII were prepared by mixing the listed ingredients in the amounts indicated.

TABLE VII

| | Radiation curable composition (parts by weight) | | |
|---|---|---|---|
| | UV-15 | UV-16 | UV-17 |
| Pentaerythritol triacrylate | 55 | 65 | 60 |
| Triacrylate ester of tris-(hydroxyethyl)isocyanurate | 10 | — | — |
| Ethoxylated bisphenol A diacrylate | — | 30 | — |
| Cycloaliphatic epoxide$^{(a)}$ | 25 | — | — |
| Neopentylglycol diglycidyl ether | 10 | — | — |
| Resorcinol diglycidyl ether | — | — | 30 |
| 1,4-Bis(hydroxymethyl) cyclohexane diglycidyl ether | — | — | 10 |
| N—Vinyl-2-pyrrolidone | — | 5 | — |
| Quartz | 43 | — | — |
| Cryolite | — | 122 | 122 |
| Diphenyliodonium hexafluorophosphate | 0.60 | — | 0.60 |
| 2-Isopropylthioxanthone | 0.060 | — | 0.060 |
| 2,2-Dimethoxy-1,2-diphenyl-1-ethanone | 1.50 | 2.0 | 1.50 |

$^{(a)}$"Cyracure 6100", Union Carbide Corp.

Abrasive constructions were prepared using Rayon Jeans Cloth that was saturated with phenolic latex resin and cured by heating in an oven at 88° C. for 10 hours. Composition UV-15, as a make coat, was knife coated onto the backing at a loading of 84 g/m², then 326 g/m² of grade P120 Al$_2$O$_3$ mineral was coated onto the make coat, and the coating cured by four passes in air at 7.5 cm/sec under a Fusion Model F450 lamp operated at 120 watts/cm. The lamps were located at a distance of about 6.3 cm from the backing. Composition UV-16, as a size coat, was roll coated onto a first portion of the mineral coated construction at a coating weight of 212 g/m² and cured under the same conditions used to cure the make coat (Example 18). A second portion of the mineral coated construction was roll coated with UV-17 composition and cured under the same conditions as was the size coat of Example 18 (Example 19). A third portion of the mineral coated construction was roll coated with cryolite filled phenol-formaldehyde resole resin at a coating weight of 176 g/m² and cured by heating in an oven at 88° C. for 10 hours (Example 20).

COMPARATIVE EXAMPLE B

Phenol-formaldehyde resole resin was coated onto phenolic latex saturated Rayon Jeans backing at a weight of 100 g/m². Grade P120 Al$_2$O$_3$ mineral was electrostatically coated thereon at a weight of 326 g/m². The resin was partially cured by heat in an oven for 1½ hours at 88° C. Cryolite filled phenol-formaldehyde resin size coat was applied over the make coat and mineral coat and cured in the same manner as in Comparative Example A.

Each cured coated abrasive construction was cut into strips and converted to endless belts that were subjected to the belt grinding tests using 1018 steel at a loading pressure at the grinding interface of 0.70 kg/cm². The performance of each belt is shown in Table VIII.

TABLE VIII

| | | | Abrasive cutting performance (g) | | |
|---|---|---|---|---|---|
| Example | Make coat | Size coat | Initial | Final | Total |
| 18 | UV-15 | UV-16 | 39 | 18 | 505 |
| 19 | UV-15 | UV-17 | 37 | 16 | 455 |
| 20 | UV-15 | Phenolic | 33 | 15 | 415 |
| B* | Phenolic | Phenolic | 26 | 12 | 330 |

*Comparative example which was cured with heat and no electromagnetic radiation.

Examples 18-20 show that abrasive articles having excellent abrasive performance can be prepared using phenolic resin-containing substrates when the electromagnetic radiation curable compositions of the present inventinon are used as the make coat. The size coat can be a radiation cured composition containing epoxy and acrylic groups or it can be a phenolic resin, and the abrasive construction will still provide high quality cutting performance.

EXAMPLES 21-27

Abrasive sheeting having a cloth backing was prepared as follows. Spun polyester cloth, as described in Examples 5-8, was saturated with radiation curable composition UV-18 having the composition shown in Table IX and cured in air at 20 cm/sec using an RPC Processor #QC1202 ANIR having the first lamp set at 80 watts/cm and the second lamp set at 40 watts/cm. The lamps were located at a distance of about 9.5 cm from the backing. The saturated cloth was then presized with UV-18, cured, and then the backside of the cloth cured, the curing carried out under the same conditions as used to cure the saturant. The cured saturated cloth backing was labeled "I". In a similar manner, spun polyester cloth was saturated, presized, and backsized with UV-19, the composition of which is also shown in Table IX. Each curing step was carried out at 15 cm/sec rather than the 20 cm/sec used for backing "I". The saturated cloth backing obtained was labeled "II".

TABLE IX

| | Radiation curable composition (parts by weight) | |
|---|---|---|
| Ingredient | UV-18 | UV-19 |
| Diglycidyl ether of bisphenol A | 50 | — |
| Bireactive No. 2 | — | 75 |
| Ethoxylated bisphenol A | 25 | — |

TABLE IX-continued

| Ingredient | Radiation curable composition (parts by weight) | |
|---|---|---|
| | UV-18 | UV-19 |
| diacrylate | | |
| N—vinyl-2-pyrrolidone | 15 | 15 |
| Pentaerythritol triacrylate | 10 | 10 |
| Diphenyliodonium hexafluorophosphate | 1.25 | — |
| 60% solution of triphenyl-sulfonium hexafluorophosphate in γ-butyrolactone | — | 1.25 |
| 2-Isopropylthioxanthone | 0.125 | — |
| 2,2-Dimethoxy-1,2-diphenyl-1-ethanone | 1.0 | 1.0 |

Curable compositions UV-20 to UV-27 as shown in Table X were prepared by mixing the listed ingredients in the amounts indicated.

TABLE X

| | Radiation curable composition (parts by weight) | | | | | | | |
|---|---|---|---|---|---|---|---|---|
| | UV-20 | UV-21 | UV-22 | UV-23 | UV-24 | UV-25 | UV-26 | UV-27 |
| Resorcinol diglycidyl ether | 15 | 15 | — | — | — | — | — | — |
| Bireactive No. 2 | — | — | 17.5 | 17.5 | 17.5 | 17.5 | — | — |
| Triacrylate ester of tris(hydroxyethyl) isocyanurate | — | — | — | — | — | — | 25 | — |
| Trimethylolpropane triacrylate | — | — | — | — | — | — | 25 | — |
| Urea-formaldehyde | — | — | — | — | — | — | — | 66 |
| Pentaerythritol triacrylate | 30 | 30 | 22.5 | 22.5 | 22.5 | 22.5 | — | — |
| Cycloaliphatic epoxide$^{(a)}$ | 2.5 | 2.5 | — | — | — | — | — | — |
| N—vinyl-2-pyrrolidone | 2.5 | 2.5 | — | — | — | — | — | — |
| Styrene | — | — | 10 | 10 | 10 | 10 | — | — |
| Water | — | — | — | — | — | — | — | 4.7 |
| Diphenyliodonium hexafluorophosphate | 0.33 | 1.5 | — | — | — | — | — | — |
| 2-Isopropylthio-xanthone | 0.033 | 0.15 | — | — | — | — | — | — |
| 2,2-Dimethoxy-1,2-diphenyl-1-ethanone | 0.75 | — | 0.75 | 0.75 | 0.75 | 0.75 | 0.75 | — |
| AlCl₃ | — | — | — | — | — | — | — | 4.3 |
| Quartz | 50 | 50 | 50 | — | — | — | — | — |
| CaCO₃ | — | — | — | 50 | — | — | 50 | — |
| BaSO₄ | — | — | — | — | 50 | 50 | — | — |
| Feldspar | — | — | — | — | — | — | — | 25 |
| SbF₅·DEA·DEG | — | — | — | — | — | 0.5 | — | — |
| 60% solution of triphenylsulfonium hexafluorophosphate in γ-butyrolactone | — | — | 0.25 | 0.25 | 0.25 | 0.25 | — | — |

$^{(a)}$"Cyracure 6100", Union Carbide Corp.

Radiation curable composition UV-20 was then knife coated, as a make coat, onto treated cloth backing II for use in Examples 21-24 at a coating weight of 200 g/m². Grade 40 silicon carbide mineral was electrostatically coated at a coating weight of 495 g/m². The make coat was then cured by 4 passes in air through a Fusion Model F450 lamp at 7.5 cm/sec. The lamp was set at 120 watts/cm. The lamps were located at a distance of about 6.3 cm from the backing. Compositions UV-22, UV-23, UV-24, UV-25, and UV-27 were then roll coated onto portions of the cured construction at a weight of 450 g/m². Size coats formed of compositions UV-22 through UV-25 were cured under the same conditions used to cure the make coat. The size coat formed of compositions UV-27 was thermally cured for 10 minutes at 37° C. and 20 minutes at 60° C. The samples for Examples 25-27 were prepared in the same manner as the samples for Examples 21-24, using treated cloth backing I and the compositions shown in Table XI.

COMPARATIVE EXAMPLE C

Conventional calcium carbonate filled phenol-formaldehyde resole resin was knife-coated onto phenolic latex treated polyester cloth backing II to form a make coat. Grade 40 silicon carbide mineral was electrostatically coated onto the make coat at a weight of 495 g/m². The resin was partially cured by heat in an oven for 1½ hours at 88° C. Calcium carbonate filled phenol formaldehyde resin size coat was applied over the make coat and mineral coat and cured in the same manner as in Comparative Example A.

Each cured coated abrasive sheet from Examples 21-27 and Comparative Example C was cut into strips and converted to endless belts, which were then subjected to belt grinding tests using pressboard at loading pressure, at the grinding interface, of 0.70 kg/cm². The results of the grinding tests are shown in Table IX.

TABLE XI

| Example | Backing | Make coat | Size coat | Abrasive cutting performance (g) | | |
|---|---|---|---|---|---|---|
| | | | | Initial | Final | Total |
| 21 | II | UV-20 | UV-22 | 1052 | 718 | 4993 |
| 22 | II | UV-20 | UV-23 | 1072 | 848 | 4540 |
| 23 | II | UV-20 | UV-24 | 978 | 666 | 4623 |
| 24 | II | UV-20 | UV-25 | 992 | 827 | 5343 |
| 25 | I | UV-20 | UV-27 | 599 | 619 | 4079 |
| 26 | I | UV-20 | UV-26 | 1237 | 953 | 6309 |
| 27 | I | UV-21 | UV-22 | 1008 | 756 | 5066 |

TABLE XI-continued

| Example | Backing | Make coat | Size coat | Abrasive cutting performance (g) | | |
|---|---|---|---|---|---|---|
| | | | | Initial | Final | Total |
| C* | Phenolic | Phenolic | Phenolic | 1069 | 903 | 5496 |

*Comparative example cured with heat only and no electromagnetic radiation.

Examples 21-27 show that abrasive articles having excellent abrasive performance can be prepared on cloth backing when the compositions of this invention are used as make coat and curing is carried out with electromagnetic radiation. The cutting capability of the abrasive sheets prepared in accordance with this invention compares favorably with the cutting capability of the conventionally prepared abrasive sheeting which was cured by heating in an oven at 88° C. for 13½ hours.

Various modifications and alterations of this invention will become apparent to those skilled in the art without departing from the scope and spirit of this invention, and it should be understood that this invention is not to be unduly limited to the illustrated embodiment set forth herein.

What is claimed is:

1. Method of preparing a coated abrasive product comprising a backing, a make coat, a layer of abrasive grains, and a size coat, wherein at least one of the make coat and size coat is formed from a composition curable by electromagnetic radiation comprising ethylenically-unsaturated groups and 1,2-epoxide groups, and a photoinitiator portion, in an amount sufficient to cure the composition, comprising at least one polymerization photoinitiator selected from the group consisting of:
   (I) salts having an onium cation and a halogen-containing anion of a metal or metalloid, and
   (II) a mixture of (A) at least one salt having an organometallic complex cation and a halogen-containing complex anion of a metal or metalloid, and
   (B) at least one free-radical polymerization initiator, comprising the steps of
   (1) providing said backing,
   (2) applying said make coat over said backing,
   (3) applying said layer of abrasive grains over said make coat,
   (4) applying said size coat over said layer of abrasive grains,
   (5) curing at least one of said make coat or said size coat by means of electromagnetic radiation.

2. Method of preparing a coated abrasive product comprising a backing, a make coat, a layer of abrasive grains, and a size coat, wherein said backing has at least one of a saturant coat, a presize coat, or a backsize coat, wherein at least one of said saturant coat, said presize coat, or said backsize coat is formed from a composition curable by electromagnetic radiation comprising ethylenically-unsaturated groups and 1,2-epoxide groups, and a photoinitiator portion, in an amount sufficient to cure the composition, comprising at least one polymerization photoinitiator selected from the group consisting of
   (I) salts having an onium cation and a halogen-containing anion of a metal or metalloid, and
   (II) a mixture of (A) at least one salt having an organometallic complex cation and a halogen-containing complex anion of a metal or metalloid, and
   (B) at least one free-radical polymerization initiator, comprising the steps of
   (1) providing backing having at least one of said saturant coat, said presize or said backsize coat,
   (2) curing at least one of said saturant coat, said presize coat, or said backsize coat by means of electromagnetic radiation,
   (3) applying said make coat over said backing,
   (4) applying said layer of abrasive grains over said make coat,
   (5) applying said size coat over said layer of abrasive grains, and
   (6) curing said make coat and said size coat.

* * * * *

UNITED STATES PATENT AND TRADEMARK OFFICE
CERTIFICATE OF CORRECTION

PATENT NO. : 4,836,832
DATED : June 6, 1989
INVENTOR(S) : Tumey et al.

It is certified that error appears in the above-identified patent and that said Letters Patent is hereby corrected as shown below:

In Column 2, Line 63, "1,2epoxid" should read --1,2-epoxide--.

In Column 2, Line 66, "epoxid" should read --epoxide--.

In Column 3, Line 1, "1,2epoxide" should read --1,2-epoxide--.

In Column 3, Line 2, "compound.," should read --compound,--.

In Column 3, Line 7, "containig" should read --containing--.

In Column 3, Line 37, "Overalying" should read --Overlaying--.

In Column 5, Line 25, after "Shell", insert --Chemical Co., "DER-331", "DER-332" and "DER-334", available--.

In Column 5, Line 32, after "Inc.)", insert --.--.

In Column 5, Line 59, "ERL-4051" should read --ERL-4052--.

UNITED STATES PATENT AND TRADEMARK OFFICE
CERTIFICATE OF CORRECTION

PATENT NO. : 4,836,832
DATED : June 6, 1989
INVENTOR(S) : Tumey et al.

It is certified that error appears in the above-identified patent and that said Letters Patent is hereby corrected as shown below:

In Column 6, Line 22, "reacting" should read --reaction--.

In Column 7, Line 36, "instablility" should read --instability--.

In Column 7, Line 37, "therof" should read --thereof--.

In Column 7, Line 38, "naphyhyl" should read --naphthyl--.

In Column 9, Line 40, "hexafluoroarsente" should read --hexafluoroarsenate--.

In Column 10, Line 24, "usedful" should read --useful--.

In Column 10, Line 39, "2-isoprpylthioxanthone" should read --2-isopropylthioxanthone--.

In Column 11, Line 47, "equivatent" should read --equivalent--.

In Column 12, Line 2, "conventioal" should read --conventional--.

UNITED STATES PATENT AND TRADEMARK OFFICE
CERTIFICATE OF CORRECTION

PATENT NO. : 4,836,832

DATED : June 6, 1989

INVENTOR(S) : Tumey et al.

It is certified that error appears in the above-identified patent and that said Letters Patent is hereby corrected as shown below:

In Column 12, Line 16, "avioded" should read --avoided--.

In Column 12, Line 23, "no" should read --not--.

In Column 12, Line 30, "steartae" should read --stearate--.

In Column 12, Line 33, "other wise" should read --otherwise--.

In Column 12, Line 51, "ethoxylated bisphenol A" should be dropped down one line to be even with ""SR-349", ARCO Chemicals".

In Column 13, Line 27, "9,5" should read --9.5--.

In Column 13, Line 68, "showns" should read --shown--.

In Column 20, Line 34, "inventinon" should read --invention--.

UNITED STATES PATENT AND TRADEMARK OFFICE
CERTIFICATE OF CORRECTION

PATENT NO. : 4,836,832

DATED : June 6, 1989

INVENTOR(S) : Tumey et al.

It is certified that error appears in the above-identified patent and that said Letters Patent is hereby corrected as shown below:

In Column 21, Line 67, "compositions" should read --composition--.

In Column 24, Line 30, after "providing", insert --said--.

Signed and Sealed this

Twenty-first Day of August, 1990

Attest:

HARRY F. MANBECK, JR.

*Attesting Officer*   *Commissioner of Patents and Trademarks*